No. 643,774. Patented Feb. 20, 1900.
A. G. MICHIE.
RAIL JOINT.
(Application filed Sept. 25, 1899.)
(No Model.)
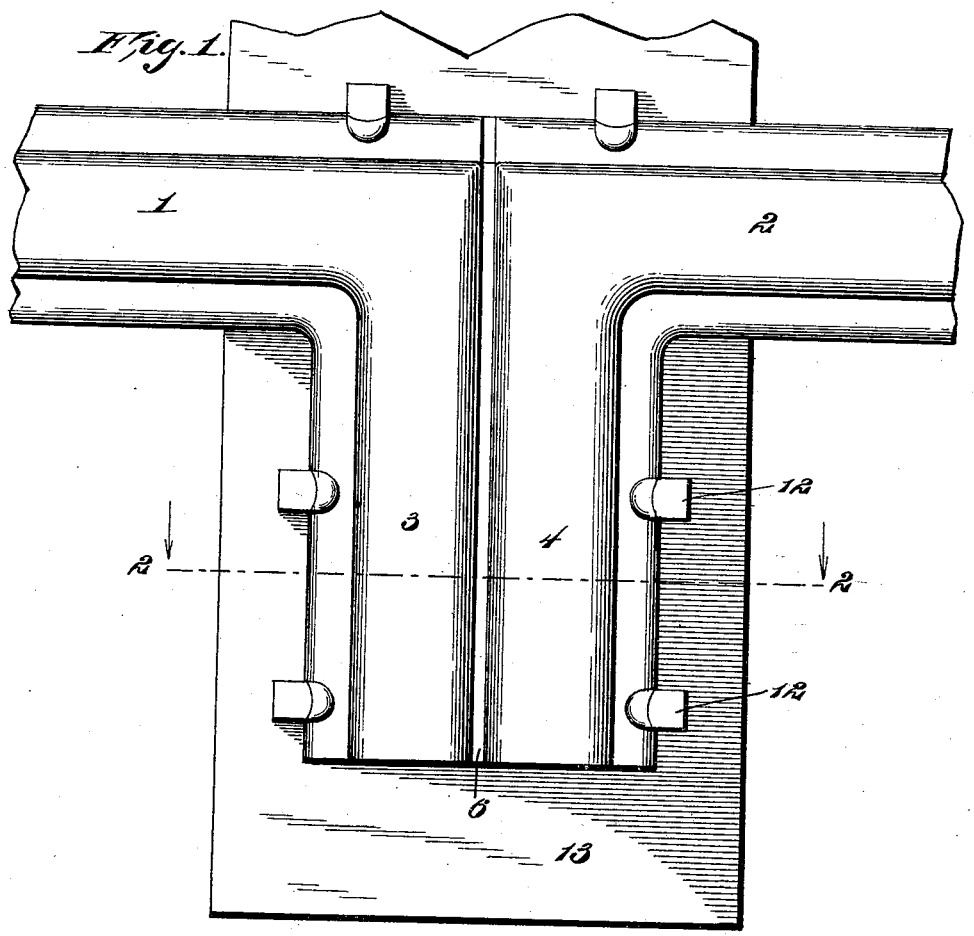
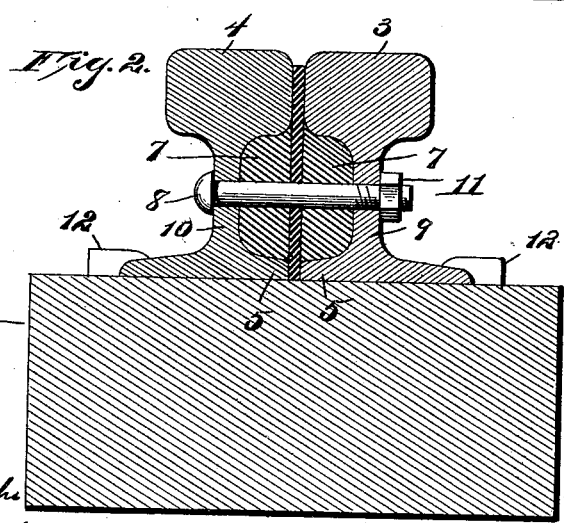
Witnesses
Louis D. Heinrichs
J. M. Cleary
Inventor
Andrew G. Michie
By Victor J. Evans, Attorney

UNITED STATES PATENT OFFICE.

ANDREW GRAY MICHIE, OF BRAINERD, MINNESOTA.

RAIL-JOINT.

SPECIFICATION forming part of Letters Patent No. 643,774, dated February 20, 1900.

Application filed September 25, 1899. Serial No. 731,592. (No model.)

*To all whom it may concern:*

Be it known that I, ANDREW GRAY MICHIE, a citizen of the United States, residing at Brainerd, in the county of Crow Wing and State of Minnesota, have invented certain new and useful Improvements in Rail-Joints, of which the following is a specification.

My invention relates to joints for railroad-rails, the primary object being to provide a secure and durable connection between the ends of the rails without the use of fish-plates or splice-bars, which are usually employed to overlap the meeting ends of the rails.

Further objects of the invention are to provide for contraction and expansion of the rail-sections and to secure and brace the meeting ends of the rails upon a railway-tie in such a manner as to insure great strength and rigidity at the joint, which has heretofore been the weakest part of the rail.

The construction of my improvement will be fully described hereinafter in connection with the accompanying drawings, which form a part of this specification, and its novel feature will be defined in the appended claims.

In the drawings, Figure 1 is a plan view of a rail-joint embodying the invention, and Fig. 2 is a vertical section on the line 2 2 of Fig. 1.

The reference-numerals 1 and 2 designate rail-sections, the ends of which are bent outward at right angles to form parallel arms or braces 3 and 4 approximately one foot in length.

As shown in Fig. 2, a portion of the base 5 of each of the outwardly-turned ends of the rails is cut away to permit said ends to closely approach each other, and a washer 6, consisting of a strip of rubber or other yielding material, is interposed between the meeting sides of the arms or braces 3 and 4 to permit expansion and contraction. The spaces between the washer 6 and the adjacent sides of the arms 3 and 4 are closed by filling-strips 7, preferably made of wood and held in place by bolts 8, which also extend through the washer 6 and the webs 9 and 10 of the arms or braces 3 and 4 and are held by nuts, as shown at 11 in Fig. 2.

The arms 3 and 4 are held by spikes 12, driven into the tie 13, and, as is clearly shown in the drawings, the connected arms of the rails rest upon the tie and have an extended lateral bearing thereon, thus giving great strength at the joint, which is a matter of great importance.

I claim—

1. A rail-joint comprising rail-sections turned outward at right angles and having a portion of the base of each section cut away; and means for securing said arms or braces together.

2. A rail-joint comprising rail-sections having their ends bent outward at right angles and cut away at the base in combination with a yielding washer between the arms or braces, and means for securing the arms together.

3. The combination with two rail-sections having their ends bent outward at right angles and cut away at the base, a washer interposed between the bent ends of the rails, filling-strips between the washer and rail-sections, bolts for securing the rail ends together, and spikes for securing them to a railway-tie.

In testimony whereof I affix my signature in presence of two witnesses.

ANDREW GRAY MICHIE.

Witnesses:
MILTON MCFADDEN,
GEO. A. KUNE.